US012780656B2

(12) United States Patent
Gupta et al.

(10) Patent No.: US 12,780,656 B2
(45) Date of Patent: *Nov. 3, 2026

(54) METHANE PYROLYSIS USING STACKED FLUIDIZED BEDS WITH ELECTRIC HEATING OF COKE

(71) Applicant: EXXONMOBIL TECHNOLOGY AND ENGINEERING COMPANY, Annandale, NJ (US)

(72) Inventors: Ramesh Gupta, Berkeley Heights, NJ (US); Amrit Jalan, Bridgewater, NJ (US); Hugo S. Caram, Allentown, PA (US); David C. Dankworth, Princeton, NJ (US)

(73) Assignee: EXXONMOBILE TECHNOLOGY AND ENGINEERING COMPANY, Spring, TX (US)

( * ) Notice: Subject to any disclaimer, the term of this patent is extended or adjusted under 35 U.S.C. 154(b) by 622 days.

This patent is subject to a terminal disclaimer.

(21) Appl. No.: 18/248,888

(22) PCT Filed: Oct. 16, 2020

(86) PCT No.: PCT/US2020/055994

§ 371 (c)(1),
(2) Date: Apr. 13, 2023

(87) PCT Pub. No.: WO2022/081170

PCT Pub. Date: Apr. 21, 2022

(65) Prior Publication Data

US 2023/0391617 A1 Dec. 7, 2023

(51) Int. Cl.
*C01B 3/28* (2026.01)

(52) U.S. Cl.
CPC ........ *C01B 3/28* (2013.01); *C01B 2203/0272* (2013.01); *C01B 2203/0833* (2013.01); *C01B 2203/1614* (2013.01)

(58) Field of Classification Search
None
See application file for complete search history.

(56) References Cited

U.S. PATENT DOCUMENTS 2,982,622 A 5/1961 Jahnig et al.
3,284,161 A 11/1966 Pohlenz et al.
(Continued)

FOREIGN PATENT DOCUMENTS

AU 2004202956 A1 7/2004
DE 1266273 4/1968
JP 2018-532793 A 11/2018

OTHER PUBLICATIONS

Office Action received for Canadian Patent Application No. 3194957, mailed on Jun. 3, 2025, 4 pages.
(Continued)

*Primary Examiner* — John J Figueroa
(74) *Attorney, Agent, or Firm* — Shook Hardy & Bacon L.L.P.

(57) ABSTRACT

Systems and methods are provided for conversion of methane and/or other hydrocarbons to hydrogen by pyrolysis while reducing or minimizing production of carbon oxides. The heating of the pyrolysis environment can be performed at least in part by using electrical heating within a first stage to heat the coke particles to a desired pyrolysis temperature. This electrical heating can be performed in a hydrogen-rich environment in order to reduce, minimize, or eliminate formation of coke on the surfaces of the electrical heater. The heated coke particles can then be transferred to a second stage for contact with a methane-containing feed, such as a natural gas feed. Depending on the configuration, pyrolysis of methane can potentially occur in both the first stage and second stage. In some aspects, the hydrogen-rich environment in the first stage is formed by passing the partially converted effluent from the second stage into the first stage.

(Continued)

In such aspects, the partially converted effluent from the second stage can have an $H_2$ content of 60 vol % or more, or 70 vol % or more, or 80 vol % or more, such as up to 99 vol % or possibly still higher.

16 Claims, 2 Drawing Sheets

(56) References Cited

U.S. PATENT DOCUMENTS

| | | | | |
|---|---|---|---|---|
| 3,424,554 | A * | 1/1969 | Lewis, Jr. | C10B 55/10 208/50 |
| 4,254,557 | A | 3/1981 | Mayer et al. | |
| 9,359,200 | B2 | 6/2016 | Maass et al. | |
| 9,938,144 | B2 | 4/2018 | Maass et al. | |
| 12,358,788 | B2 * | 7/2025 | Gupta | C01B 3/28 |

OTHER PUBLICATIONS

Office Action received for Korean Patent Application No. 10-2023-7012563, mailed on Apr. 18, 2025, 6 pages (3 pages of English Translation and 3 pages of Original Office Action).

Office action received for Canadian Patent Application No. 3194957, mailed on May 15, 2024, 4 pages.

Notice of Allowance received for Japanese Patent Application No. 2023-523114, mailed on Nov. 19, 2024, 5 pages (3 pages of original copy and 2 pages of English Translation).

Office Action received for Chinese Patent Application No. 202080106233.3, mailed on Aug. 6, 2025, 13 pages (7 pages of English Translation and 6 pages of Original Office Action).

Office action received for Chinese Patent Application No. 202080106233.3, mailed on May 27, 2024, 12 pages (6 pages of Original OA and 6 pages of English Translation).

Office action received for Japanese Patent Application No. 2023-523114, mailed on Jun. 25, 2024, 10 pages (5 pages of Original OA and 5 pages of English Translation).

International Preliminary Report on Patentability PCT/US2020/055994 issued Apr. 13, 2023 (7 pages).

Cocco et al., "Introduction to Fluidization", American Institute of Chemical and Engineers, pp. 21-29 (Nov. 2014).

Office action received for Chinese Patent Application No. 202080106233.3, mailed on Dec. 17, 2024, 8 pages (4 pages of Original OA and 4 pages of English Translation).

* cited by examiner

METHANE PYROLYSIS USING STACKED FLUIDIZED BEDS WITH ELECTRIC HEATING OF COKE

FIELD OF THE INVENTION

This invention relates to systems and methods for converting methane to hydrogen while reducing or minimizing production of $CO_2$.

BACKGROUND OF THE INVENTION

One of the challenges for carbon capture or sequestration technology is applying such technology to the widely varying types of processes that consume hydrocarbons and generate $CO_2$. In addition to the difficulties of applying carbon capture technology to small point sources such as automobiles, even larger $CO_2$ sources can present problems. For example, although a refinery might be viewed as a single $CO_2$ source, current refinery configurations more closely resemble a large plurality of smaller sources. This can make it difficult to achieve economies of scale for carbon capture, as attempting to divert $CO_2$ from the various sources in a refinery to a single $CO_2$ sequestration unit presents its own challenges.

As an alternative to attempting to collect $CO_2$ from multiple point sources would be to first convert hydrocarbons to hydrogen at a central location, and then distribute the hydrogen to various systems and/or processes for consumption. In a refinery setting this could be accomplished, for example, by steam reforming of hydrocarbons (such as methane). While this can potentially create a single $CO_2$ source, the underlying problem of substantial $CO_2$ generation still remains.

An alternative to using steam reforming to generate hydrogen is to use methane pyrolysis (or more generally hydrocarbon pyrolysis). During pyrolysis, methane can be converted into hydrogen and solid carbon, thus avoiding the stoichiometric $CO_2$ production associated with steam reforming.

Unfortunately, methane pyrolysis provides a variety of additional challenges. For example, in addition to being an endothermic process, methane pyrolysis requires temperatures well above the temperatures needed for steam reforming. Generating the heat required to achieve such temperatures can potentially be a source of $CO_2$. In order to mitigate the heating requirement, efficient recovery and/or transfer of heat is also desirable. Other difficulties can be related to managing heat within the reaction zone of a reactor while also maintaining a desirable reaction rate.

What is needed are systems and methods that can allow for conversion of methane (or other hydrocarbons) to hydrogen while reducing or minimizing production of $CO_2$. Preferably, the systems and methods can allow for heat management and heat recovery while also maintaining a commercially desirable reaction rate.

U.S. Pat. No. 3,284,161 describes a method for production of hydrogen by catalytic decomposition of a gaseous hydrocarbon stream. The method is performed in a two-vessel system. In a first vessel, the gaseous hydrocarbon is exposed to a catalyst at elevated temperature to form hydrogen and carbon, with the carbon being deposited on the catalyst. After separating the catalyst from the products (and any unreacted feed), the catalyst is then passed into a regenerator, where the carbon on the catalyst is combusted. The heat generated during combustion is then at least partially carried back to the first vessel by recirculation of the catalyst. Prior to contacting the catalyst particles with the gaseous feed, the catalyst particles are stripped with hydrogen generated in the reaction zone. This is described as beneficial for reducing production of carbon oxides in the reaction zone.

U.S. Pat. No. 3,284,161 describes systems and methods for catalytic decomposition of methane in a counter-current flow reactor. The reactor is described as including side-to-side plates to provide multiple contacting stages within the reactor.

U.S. Pat. No. 9,359,200 describes systems and methods for thermal decomposition of methane. The methane is exposed to a counter-current flow of carbonaceous particles in either a fluidized bed or moving bed environment at sufficient temperature to pyrolyze the methane to hydrogen and carbon. The process is described as also being useful for converting smaller coke particles that are not suitable for use as fuel in blast furnace environment into particles that can be used as a fuel.

In a journal article titled "Introduction to Fluidization" (Cocco et al., pages 21-29, November 2014 issue of CEP Magazine, published by American Institute of Chemical Engineers), a detailed example is provided for how to calculate the minimum fluidization velocity for particles in a fluidized bed.

SUMMARY OF THE INVENTION

In some aspects, a method for performing hydrocarbon pyrolysis to form $H_2$ is provided. The method can include heating a first fluidized bed of coke particles using one or more electric heating elements within the first fluidized bed to a temperature of 1000° C. or more in a first fluidized bed stage. A gas environment in the first fluidized bed can include 60 vol % or more $H_2$. The method can further include flowing at least a portion of the coke particles from the first fluidized bed into a second fluidized bed stage comprising coke particles. The second fluidized bed stage can include a second fluidized bed having a temperature of 1000° C. or more. The method can further include contacting a hydrocarbon-containing feed with coke particles in the second fluidized bed stage under pyrolysis conditions to form a partially converted effluent comprising $H_2$. Additionally, the method can include contacting at least a portion of the partially converted effluent with the first fluidized bed stage of coke particles to form an $H_2$-containing product.

In some aspects, a system for performing hydrocarbon pyrolysis is provided. The system can include a first fluidized bed stage including a first fluidized bed of coke particles and one or more electric heating elements within the first fluidized bed. The system can further include a second fluidized bed stage including a second fluidized bed of coke particles. The second fluidized bed stage can be in fluid communication and particle transport communication with the first fluidized bed stage. The system can further include a particle recycle loop providing fluid communication between a first upstream fluidized bed in the second fluidized bed stage and a final downstream fluidized bed in the first fluidized bed stage. The particle recycle loop can include a pneumatic transport conduit. The system can further include a feed inlet in fluid communication with the second fluidized bed stage. Additionally, the system can include a product effluent outlet in fluid communication with the first fluidized bed stage.

DETAILED DESCRIPTION OF THE EMBODIMENTS

Figure 1:
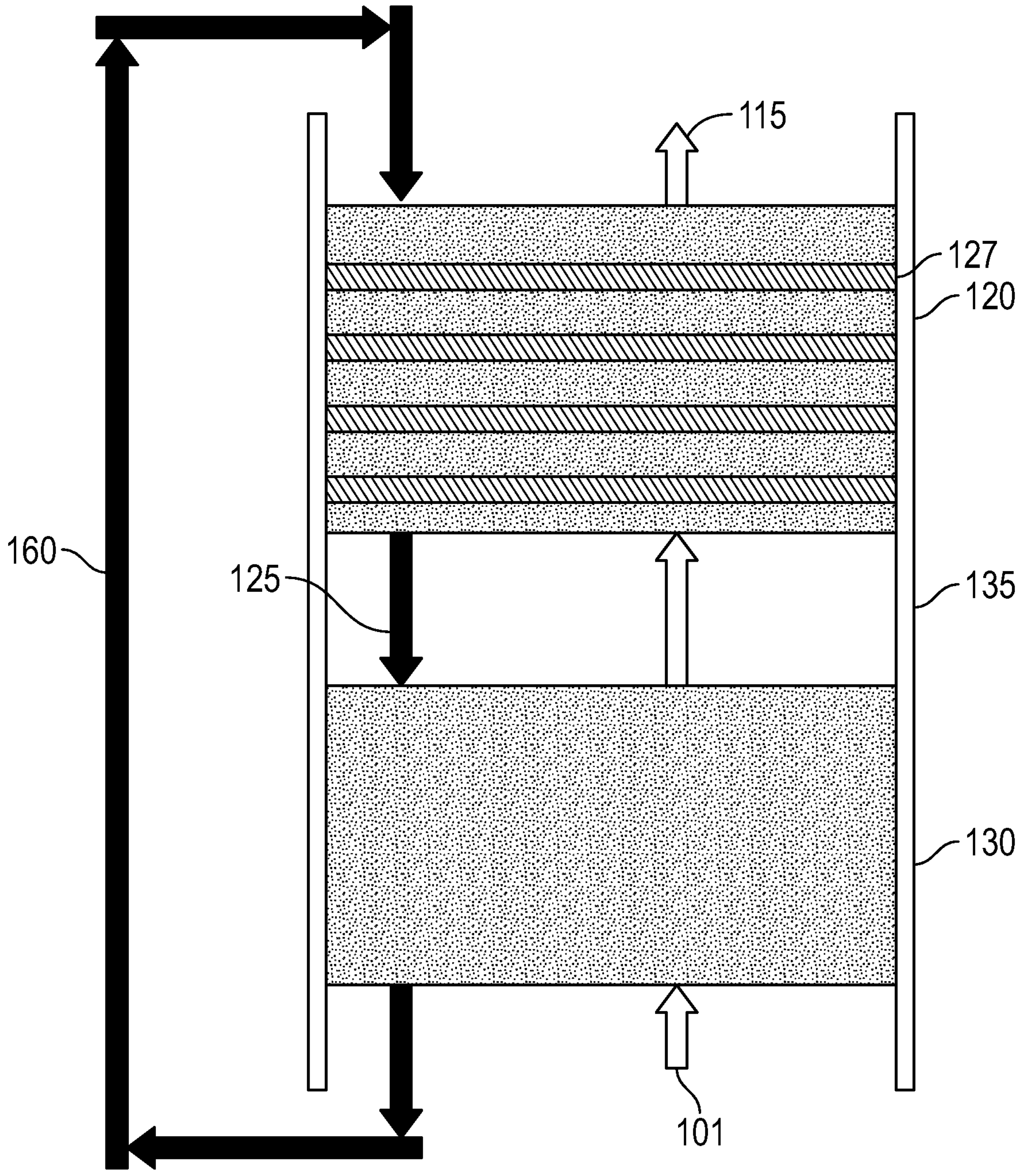
FIG. 1 shows an example of a reaction system for using electric heating of a fluidized bed to perform hydrocarbon pyrolysis.

All numerical values within the detailed description and the claims herein are modified by "about" or "approximately" the indicated value, and take into account experimental error and variations that would be expected by a person having ordinary skill in the art.

Overview

In various aspects, systems and methods are provided for conversion of methane and/or other hydrocarbons to hydrogen by pyrolysis while reducing or minimizing production of carbon oxides. The heating of the pyrolysis environment can be performed at least in part by using electrical heating within a first stage to heat the coke particles to a desired pyrolysis temperature. This electrical heating can be performed in a hydrogen-rich environment in order to reduce, minimize, or eliminate formation of coke on the surfaces of the electrical heater. The heated coke particles can then be transferred to a second stage for contact with a methane-containing feed, such as a natural gas feed. Depending on the configuration, pyrolysis of methane can potentially occur in both the first stage and second stage. In some aspects, the hydrogen-rich environment in the first stage is formed by passing the partially converted effluent from the second stage into the first stage. In such aspects, the partially converted effluent from the second stage can have an $H_2$ content of 60 vol % or more, or 70 vol % or more, or 80 vol % or more, such as up to 99 vol % or possibly still higher. Additionally or alternately, in such aspects the partially converted effluent can have a methane content of 40 vol % or less, or 30 vol % or less, or 20 vol % or less, such as down to 1.0 vol % or possibly still lower.

One of the difficulties with using methane pyrolysis (or more generally hydrocarbon pyrolysis) to convert methane (or hydrocarbons) into hydrogen and solid carbon is reducing or minimizing secondary reactions within the pyrolysis environment. As an example, one way to provide the heat for methane pyrolysis in a fluidized bed setting would be to combust hydrogen made by methane pyrolysis to heat coke particles formed from the carbon. While this would appear to avoid addition of $CO_2$ to the pyrolysis environment, combustion of hydrogen does create water. The presence of water in an environment with heated coke particles will lead to secondary reactions that result in formation of $CO_2$. Thus, even though combustion of hydrogen in a methane pyrolysis environment does not directly lead to production of $CO_2$, combustion of hydrogen produces products that facilitate secondary reactions that result in $CO_2$ production.

Another consideration for conversion of methane into hydrogen and solid carbon is providing the necessary heat for performing methane pyrolysis without consuming most or all of the resulting desired hydrogen product as fuel for the pyrolysis environment. Based on the stoichiometry of methane pyrolysis, if the carbon from the methane is successfully converted to solid carbon, $CO_2$ is not formed. From a carbon capture perspective, this is a favorable outcome, as the carbon product is a solid that can be used or disposed of in any convenient manner. However, formation of $CO_2$ is strongly exothermic, and represents more than half of the heating value that would normally be expected from combustion of methane. As a result, the heating value of the hydrogen generated by methane pyrolysis represents roughly 45% of the initial heating value of the methane feed. This can pose difficulties with attempting to use hydrogen from the methane pyrolysis as the fuel for heating the pyrolysis environment, as after thermal losses are accounted for, a substantial portion of the hydrogen produced may be needed just to maintain the desired reaction temperature for pyrolysis.

One alternative to combustion of hydrogen for providing the heat for the reaction environment is to combust another type of fuel. This can be effective, but creates an additional difficulty due to the $CO_2$ produced by other fuels. If a carbon-containing fuel is combusted in-situ, then $CO_2$ is created in the reaction environment. This could require additional downstream processing of the effluent from the pyrolysis reactor, so that the $CO_2$ reduction benefits of forming hydrogen by pyrolysis are not lost due to the combustion required to heat the reaction environment. Indirect heating of the reaction environment can allow any $CO_2$ capture equipment to be part of a separate processing train from the pyrolysis effluent, but risks formation of still greater amounts of $CO_2$ due to the lower efficiencies associated with indirect heating.

For pyrolysis performed in a fluidized bed environment, electric heating of the fluidized bed can mitigate some of the difficulties associated with achieving and maintaining the desired temperatures for methane pyrolysis while reducing or minimizing secondary reactions in the pyrolysis environment. Electric heating can be performed within the fluidized bed environment by including electric heating elements within the fluidized bed. Due to the nature of a fluidized bed, this can allow for efficient heat transfer between a heating element and the fluidized bed. The electric heating can be used to heat at least one fluidized bed (in an $H_2$-rich environment) to a temperature of 1000° C. or more, for transfer of the coke particles to a pyrolysis bed operated at 1000° C. or more. It is noted that some pyrolysis can occur at temperatures below 1000° C., but without at least one fluidized bed for pyrolysis at a temperature of roughly 1000° C. or more, the reactor size would need to be excessively large in order to achieve commercial scale production of hydrogen.

Because electric heating does not involve performing additional reactions within the pyrolysis reaction environment, the number of secondary reactions caused by electrical heating are minimized. However, including electric heating elements in a fluidized bed environment that contains coke particles could lead to transfer of coke from the coke particles to the heating elements. In order to mitigate or even eliminate this transfer of coke, the electric heating can be performed in a fluidized bed environment in the presence of a substantial amount of $H_2$ and/or in the presence of a reduced or minimized amount of methane. This can be achieved, for example, by heating a first fluidized bed of coke particles with a hydrogen-rich environment, and then passing the heated coke particles from the first fluidized bed to a second fluidized bed of coke particles that is exposed to a methane-rich environment.

With regard to additional $CO_2$ production, it is noted that the $CO_2$ production associated with electric heating can vary depending on the power source used for generating the electricity. Due to transmission line losses, electricity generated at a remote electric power generation facility by combustion of hydrocarbon fuels can have a relatively high $CO_2$ output per unit of electrical energy. On the other hand, if electricity from renewable energy is available, the $CO_2$ output per unit of electrical energy can be relatively low.

In some aspects, the conversion of hydrocarbons to hydrogen can be performed in one or more pyrolysis or conversion reactors that contain a plurality of sequential fluidized beds. The fluidized beds are arranged so that the coke particles that form the fluidized bed move in a counter-current direction relative to the gas phase flow of feed and/or product (e.g., methane, partially converted effluent, $H_2$) in the fluidized beds. In such aspects, the electrical heating of the coke particles can occur in at least one bed of a first group of one or more fluidized beds. The coke particles can then be transferred to a second group of one or more fluidized beds for contact with fresh feed. By using a plurality of sequential fluidized beds, the heat transfer and management benefits of fluidized beds can be realized while also at least partially achieving the improved reaction rates that are associated with a plug flow or moving bed reactor.

It is noted that inclusion of 4 fluidized beds or more, or 5 fluidized beds or more, can be sufficient to achieve a majority of the kinetic reaction benefits of a plug flow moving bed reactor. The pyrolysis/conversion reactor can include a substantially oxygen-free reaction environment under fluidized bed reaction conditions. Because the pyrolysis environment is substantially oxygen-free, this can allow pyrolysis of methane to hydrogen and carbon with reduced or minimized direct formation of carbon oxides.

In aspects where a plurality of fluidized beds are used for performing pyrolysis, the plurality of fluidized can also provide advantages with regard to reaction rate. The conversion of methane to hydrogen and carbon is an equilibrium reaction. As a result, as the concentration of hydrogen in the local environment is increased, the net conversion rate of methane to hydrogen and carbon is decreased. In a reactor where a single fluidized bed is used for pyrolysis, the well-mixed nature of fluidized beds can result in a relatively uniform hydrogen concentration throughout the bed. This reduces the net conversion of hydrogen when pyrolysis is performed in a single fluidized bed.

By using a plurality of fluidized beds that operate under pyrolysis conditions, the concentration of hydrogen can vary in the beds. For example, as methane feed flows upward through the fluidized beds, the methane will reach a first bed that is operating under pyrolysis conditions. In this first bed, the hydrogen content will be relatively low. This can allow for rapid conversion of methane to hydrogen and carbon in the first bed. As the gas flow continues upward, the gas flow will reach the second fluidized bed operating under pyrolysis conditions. Because some hydrogen is already present in the gaseous feed to the second bed, the concentration of hydrogen in the second fluidized bed will be higher, leading to a lower reaction rate. However, based on the increased reaction rate achieved in the first fluidized bed operated under pyrolysis conditions, a net increase in conversion rate can be achieved. Without being bound by any particular theory, it is noted that combining $H_2$ and carbon (solid) to form methane requires two hydrogen molecules, making such a reaction a second order reaction in $H_2$ concentration under standard kinetic models. Because of this second order dependence, the reaction rate for formation of methane is believed to vary as the square of the $H_2$ concentration. As a result, performing the pyrolysis reaction in multiple fluidized beds does not merely result in a reaction rate corresponding to a single bed having a similar total size. Instead, the increase in reaction rate achieved in fluidized beds with low concentration can be greater than the decrease in reaction rate in fluidized beds with higher concentration. This allows the plurality of fluidized beds to provide a higher net reaction rate for methane conversion than would be achieved by a single fluidized bed of the same size.

By using a plurality of sequential fluidized beds, advantages can be achieved for methane pyrolysis relative to configurations employing either a moving bed or a single fluidized bed of a similar size to the sequential fluidized beds. With regard to a single fluidized bed of similar size, it is noted that fluidized beds represent well-mixed environments. Thus, although gases in the fluidized bed do have a net flow direction, the concentration of gases within a fluidized bed is relatively constant throughout the bed. This allows a fluidized bed to have excellent heat transport capabilities, so that a relatively uniform temperature is present throughout the fluidized bed. However, for equilibrium reactions, it also means that the entire bed operates at the average concentration of reactants and products within the bed. Thus, for equilibrium reactions where the dependence on product concentration is second order (or higher) for at least one of the products, using a single fluidized bed can cause a significant decrease in net conversion rate relative to using a plurality of sequential fluidized beds having a similar total volume.

A counter-current plug flow type configuration for methane pyrolysis is an alternative option for achieving an increased net conversion rate of methane relative to a single fluidized bed configuration. A moving bed configuration can achieve increased net conversion rate for methane pyrolysis because the concentration of hydrogen is low in the portions of the moving bed where methane is first exposed to pyrolysis conditions. However, maintaining temperature control throughout a moving bed is difficult. In particular, in a moving bed or plug flow environment, transport of heat in the lateral direction (perpendicular to the flow direction of the moving bed) is poor. This means that external heating methods based on electric heating have significant difficulties in providing heat for the pyrolysis reaction in the interior of the moving bed. This can potentially be overcome by using heating tubes that are internal to the moving bed environment, but using a sufficient number of heating tubes to provide relatively even heating throughout a moving bed can also result in significant disruption or turbulence in the flow pattern. Such turbulence modifies the properties of a moving bed so that it behaves more like a fluidized bed, thus defeating the purpose of using the moving bed. Another alternative could be to use a direct heating method, such as by transferring the moving bed particles to a second reaction environment and heating the particles directly by combustion. Transferring heat into the moving bed by heating the particles can overcome the lateral heat transport difficulties for a moving bed. However, such heating of particles by combustion typically requires combustion of hydrocarbons. This would result in substantial $CO_2$ production, thus reducing or minimizing the benefit of performing the methane pyrolysis.

In contrast to systems using a single fluidized bed or a counter-current moving bed, in various aspects a plurality of sequential fluidized beds can be used to perform hydrocarbon pyrolysis. Using a plurality of sequential fluidized beds allows the heat transport benefits of fluidized beds to be achieved, so that external heating methods can be used, while still achieving an increase in net conversion rate similar to the increase provided by a moving bed reactor.

Additionally or alternately, systems and methods are provided for management of particle flow within one or more pyrolysis or conversion reactors that contain a plurality of sequential fluidized beds. One of the difficulties in managing fluidized bed(s) can be management of particle flow after the particles are withdrawn from the fluidized beds. For example, in order to recycle particles from the bottom of a fluidized bed reactor back to the top, some type of system is needed to move the particles. For commercial scale reactors, attempting to use mechanically-driven transport mechanisms (such as using a screw conveyor) for moving potentially thousands of tons of particles of hour can present various problems. Such problems can include particle agglomeration, binding, and/or particle abrasion to create undesired particle fines. In various aspects, difficulties with particle transport can be reduced or minimized by using pneumatic transport to circulate particles from the final bed of the sequential fluidized beds back to the initial bed. The gas used for the pneumatic transport can correspond to the hydrogen-containing product gas generated by the pyrolysis reactor. A gas-solids separator can be used at the top of the pneumatic transport conduit to recover the hydrogen-containing product gas from the solid particles. In addition to reducing or minimizing mechanical difficulties, the use of the product gas for the pneumatic transport can also avoid dilution of the desired product with another type of pneumatic gas.

After leaving the reactor, the hydrogen in the hydrogen-containing product gas can be separated from any remaining methane in the product gas by any convenient method. Examples of suitable methods include pressure swing adsorption (PSA) and membrane separation. Methane recovered from the hydrogen-containing product gas can be, for example, recycled for use as part of the feed and/or diverted for another use.

In some aspects, the plurality of fluidized beds can be organized as a vertical stack. In such aspects, transport of coke particles from one bed to another bed can be managed by using gravity-assisted flow in conjunction with the selected fluidized bed conditions.

Definitions

In this discussion, the terms "upstream" and "downstream" are defined with respect to the flow of gas in the reactor(s). Thus, a fluidized bed that is "upstream" from the fluidized beds operating under pyrolysis conditions corresponds to a fluidized bed where the gas flow primarily corresponds to unreacted methane (and/or other hydrocarbon). A fluidized bed that is "downstream" from the fluidized beds operating under pyrolysis conditions corresponds to a fluidized bed where the gas flow contains a substantial amount of hydrogen. Thus, the first group of fluidized beds is upstream from the fluidized beds that are operated under pyrolysis conditions (i.e., the second group of fluidized beds), while the third group of fluidized beds is downstream from the fluidized beds that are operated under pyrolysis conditions. It is noted that the coke particles travel in a counter-current direction, so coke particles are heated in the heat transfer beds that are "downstream" from the fluidized beds operated under pyrolysis conditions. Similarly, the coke particles are cooled in the heat transfer beds that are "upstream" from the fluidized beds that are operated under pyrolysis conditions.

In this discussion, the term "adjacent" can be used to describe the relative location of a fluidized bed. For example, a fluidized bed that is the "upstream adjacent" bed to the fluidized beds operating under pyrolysis conditions corresponds to the last heat exchange fluidized bed the methane feed is exposed to prior to being exposed to pyrolysis conditions. A fluidized bed that is "downstream adjacent" to the fluidized beds that are externally heated corresponds to the first fluidized bed that the product gas flow is exposed to after leaving the fluidized beds that are externally heated.

In this discussion, "sequential" fluidized beds refer to a plurality of fluidized beds where each fluidized bed is in both fluid communication and solid particle transport communication with any adjacent fluidized beds. Fluid communication refers to passage of gases and/or liquids between elements in a system. It is noted that particles can be entrained in a fluid, so that some solids may also be transported via fluid communication. Particle transport communication refers to transport of solids between elements in a system, such as passage of particles from a first fluidized bed to an adjacent fluidized bed. It is noted that the first bed and the last bed of the sequential fluidized beds have only one adjacent bed; the remaining fluidized beds in sequential fluidized beds have both an adjacent upstream fluidized bed and an adjacent downstream fluidized bed.

In this discussion, a "hydrocarbon-containing feed" is defined as a feed comprising 75 vol % or more of $C_1$-$C_4$ alkanes, or 90 vol % or more, or 95 vol % or more, or 98 vol % or more, such as up to substantially all of the feed corresponding to $C_1$-$C_4$ alkanes. Examples of suitable feeds include methane and natural gas. In some aspects, a hydrocarbon-containing feed can include 10 vol % or less of $N_2$, or 5.0 vol % or less, or 2.0 vol % or less, such as down to including substantially no $N_2$ (less than 0.1 vol %). In some aspects, the $H_2$ content of the input feed can be 10 vol % or less, or 1.0 vol % or less, such as down to including substantially no $H_2$ (less than 0.1 vol %).

Electric Heating and Temperature Management of Fluidized Beds of Coke Particles

In various aspects, hydrocarbon pyrolysis (such as methane pyrolysis) can be performed by using at least two fluidized beds of coke particles. Electric heating elements can be located in a first fluidized bed (in a first fluidized bed stage) that is operated with a $H_2$-rich environment.

In order to achieve methane conversion of 60% or more of an input methane feed, pyrolysis temperatures of 1000° C. or higher can be used in at least one fluidized bed of a pyrolysis reactor that has a methane-rich environment. For example, the temperature in at least one fluidized bed for pyrolysis can be 1000° C. to 1400° C., or 1000° C. to 1200° C., or 1000° C. to 1600° C., or 1100° C. to 1400° C., or 1100° C. to 1600° C., or 1200° C. to 1400° C., or 1200° C. to 1600° C. Providing such a temperature in a pyrolysis bed with a methane-rich environment means that at least one fluidized bed that includes the electric heating elements (and with an $H_2$-rich environment) will also have such a temperature.

To provide heat to coke particles in a fluidized bed, an array of electric heating elements can be included within the fluidized bed. The array of electric heating elements can have any convenient geometry or arrangement. In aspects where the fluidized bed has a sufficient height, the array of heating elements can optionally correspond to a three-dimensional array, so that the heating elements are distributed spatially within the height, width, and length of the fluidized bed. The symmetry (or lack of symmetry) for the arrangement of heating elements can correspond to any convenient type of arrangement. Possible types of arrangements can include arrangements using radial symmetry, arrangements involving a row of heating elements along an axis, rows of heating elements along more than one axis, stacked rows of heating elements where the heating elements in different rows are substantially parallel, or stacked rows of heating elements where the heating elements in different rows are not substantially parallel.

In some aspects, a single fluidized bed can include electric heating elements. In other aspects, a plurality of fluidized beds can include at least one electric heating element. In aspects where more than one fluidized bed includes a heating element, the different fluidized beds can be heated to different temperatures. The one or more fluidized beds that include electric heating elements within the fluidized bed(s) correspond to a first stage of fluidized beds. It is noted that additional fluidized beds that do not include heating elements can also be included in the first stage. In some aspects, the division of fluidized beds between a first stage of fluidized beds and a second stage of fluidized beds can correspond to a location where a fluidized bed including electric heating elements and an $H_2$-rich environment is adjacent to an upstream bed that does not include electric heating elements. If this criteria is satisfied at more than one location within a sequential plurality of fluidized beds, then the division between the first stage and the second stage corresponds to the farthest upstream location where a fluidized bed including electric heating elements and an $H_2$-rich environment is adjacent to an upstream bed that does not include electric heating elements.

Due to the elevated temperatures of fluidized beds for performing hydrocarbon pyrolysis (such as methane pyrolysis), the electric heating elements can be made from a material that is resistant to high temperatures while also having sufficient abrasion resistance to maintain structural integrity within a fluidized bed of coke particles. Silicon carbide is an example of a suitable material for forming an electric heating element. Examples of silicon carbide heating elements are sold under the brand name Kanthal® by Sandvik Materials Technology of Hallstahammar, Sweden. Other examples of materials that can be used to form heating elements can include, but are not limited to, Fe/Cr/Al alloys; molybdenum; tungsten; silicon carbide; and combinations thereof. It is noted that suitable refractory materials are also available for construction of reactors containing fluidized beds that operate at temperatures of 1000° C. or greater.

For the $H_2$-rich environment used for performing the electric heating of a fluidized bed of coke particles, such an environment can be provided by passing partially converted effluent into the at least one fluidized bed used for the electric heating. For example, the fluidized bed (or beds) for pyrolysis can convert sufficient methane so that 60 vol % or more of the partially converted effluent corresponds to $H_2$, or 70 vol % or more, or 80 vol % or more, such as up to 99 vol %. The partially converted effluent can still include some methane, such as 40 vol % or less, or 30 vol % or less, or 20 vol % or less, such as down to 1.0 vol %. Thus, some additional conversion of methane can occur in the fluidized bed (or the plurality of fluidized beds) that includes the electric heaters. It is noted that hydrogen separated from the pyrolysis effluent could be used to provide the $H_2$-rich environment for the electric heating. However, attempting to use hydrogen separated from the pyrolysis effluent could require substantial additional heating and cooling. In particular, typical processes for separation of $H_2$ from $CH_4$ are performed at temperatures well below the temperatures used for pyrolysis. Thus, using $H_2$ separated from the pyrolysis effluent would require re-heating of the $H_2$ after separation.

In addition to using electric heating elements to heat coke particles in at least one fluidized bed in an $H_2$-rich environment, other types of heat management can be used to achieve a desired temperature for hydrocarbon pyrolysis. For example, the fluidized beds are typically arranged in a counter-current manner, so that the net flow of gas within the reaction system is in the opposite direction relative to the net flow of coke particles. Based on the definition that "upstream" and "downstream" are defined based on the gas flow, the at least one fluidized bed containing electric heating elements is typically located downstream from the one or more beds where pyrolysis is performed in a methane rich environment. In some aspects, one or more upstream fluidized beds can be present that can be used to provide supplemental heating of the coke particles prior to entering the at least one fluidized bed containing the electric heating elements. The supplemental heating in the one or more upstream beds can be performed by heat exchange with the gas passing through the beds.

Another type of temperature management can be based on limiting the amount of cooling of coke particles that occurs after pyrolysis. In some aspects, the methane feed can be introduced into an initial fluidized bed of coke particles (i.e., the farthest upstream bed) having a temperature of 700° C. or more, or 800° C. or more, or 900° C. or more, or 1000° C. or more, such as up to 1400° C., or up to 1600° C. When coke particles exit from the initial fluidized bed, the coke particles can be recycled to the final bed of the reaction system (i.e., the farthest downstream bed). By having a temperature of 700° C. or more for the initial fluidized bed of coke particles, the temperature of the coke particles is maintained at an elevated temperature within the reaction system. This reduces the amount of energy input required to increase the temperature of the coke particles using electric heating. Additionally or alternately, the temperature for the initial fluidized bed of coke particles can be sufficiently high so that coke particles recycled from the initial fluidized bed of coke particles the final bed of the reaction system are at a temperature of 700° C. or more, or 800° C. or more, or 900° C. or more, such as up to 1400° C.

In aspects where only one fluidized bed is used for pyrolysis, the methane feed can be passed into a single fluidized bed for pyrolysis that is at a temperature of 1000° C. or more. Coke particles withdrawn from the pyrolysis fluidized bed are then recycled to the top of the fluidized bed containing the electric heater, which is also maintained at a temperature similar to the temperature for the pyrolysis fluidized bed.

When a plurality of sequential fluidized beds are used for the pyrolysis environment, and/or when additional sequential fluidized beds are adjacent to the at least one bed that includes electric heating elements, the additional fluidized can allow for heat exchange between coke particles and gas flow. For example, any fluidized beds that are upstream from the fluidized bed(s) that are at a temperature of 1000° C. or more can include high temperature coke particles. Such beds can be used to pre-heat the incoming methane gas flow. Similarly, any fluidized beds that are downstream from the at least one bed containing the electric heating elements can correspond to fluidized beds where the gas flow is at an elevated temperature. Such downstream beds can be used to transfer heat from the gas flow to the incoming coke particles to pre-heat the particles prior to entering the at least one bed including the electric heating elements.

Fluidized Bed Management in Sequential Plurality of Fluidized Beds

In some aspects, the methane pyrolysis reaction can be performed using a sequential plurality of fluidized beds that are arranged in at least two groups. A first group of one or more fluidized beds can correspond to fluidized beds for heating the coke particles, including heating the coke particles with electric heating elements in a $H_2$-rich environment. A second group of one or more fluidized beds can correspond to fluidized beds for pyrolysis of methane feed (or other hydrocarbon feed, such as natural gas).

In some aspects, the temperatures of the various fluidized beds can be selected in part in order to achieve a desired amount of downward migration of thermal energy from the bed(s) containing the electric heating elements and the $H_2$-rich environment to the fluidized beds in the second stage where higher concentrations of hydrocarbons are present. In order to achieve this, the heat capacity of the coke moving downward (upstream relative to the direction of gas flow) can be greater than the heat capacity of the gas moving upward (downstream relative to the direction of gas flow). Mathematically, this can be expressed as $C_p$ (coke particles) x<coke mass flow rate>>$C_p$ (gas flow) x<gas mass flow rate>, where $C_p$ is the heat capacity per gram of the coke particles or the gas flow, respectively. This can reduce or minimize the temperature difference between the fluidized bed(s) containing the electric heating elements and the upstream fluidized beds that do not include electric heating elements, but where higher concentrations of hydrocarbons are present. It is noted that the total heat capacity of the coke particle flow and the gas flow can change within the fluidized beds as pyrolysis converts methane into hydrogen and solid carbon. Thus, the heat capacity of the coke increases as the coke travels down through the sequential fluidized beds, while the heat capacity of the gas decreases as the hydrocarbon-containing feed is converted to hydrogen-containing product effluent.

In aspects where one or both of the groups of fluidized beds contains a plurality of fluidized beds, the number of beds in each group of fluidized beds can be selected to be any convenient number. In some examples, between 2 and 10 fluidized beds can be used in each group, or between 2 and 15.

It is noted that the second group of beds, corresponding to the pyrolysis reaction zone, can potentially include multiple sets of reaction conditions. For example, when multiple fluidized beds are in the group of fluidized beds for pyrolysis, at least one fluidized bed can have a temperature of 1000° C. or more. This can include having multiple fluidized beds with a temperature of 1000° C. or more, or having only a single fluidized bed with a temperature of 1000° C. or more. In such aspects, the temperature of the fluidized beds can decrease in the upstream direction.

The size of the fluidized beds can be independently selected in any convenient manner. This can allow the fluidized beds in the first group of fluidized beds and/or the second group of fluidized beds to have different sizes. Using different sized beds can change the average residence time for coke particles and/or gases within a fluidized bed. This can allow for independent control of average residence time. For example, the desired average residence time in a fluidized bed within the pyrolysis reaction zone may be different from the desired average residence time for coke particles in a fluidized bed that includes electric heating elements.

In addition to the superficial velocity of gas within the reactor, another factor in the size of the fluidized beds can be the size and quantity of openings in the bottom of the fluidized bed to allow coke particles to transfer between beds. In order to form a fluidized bed, a mesh tray or another type of sufficiently porous support structure can be used so that fluidizing gas can pass through the support structure while retaining the substantial majority of the coke particles in the fluidized bed. One or more openings or conduits can be provided in a support structure to allow a portion of the coke particles to fall from a fluidized bed at a higher elevation into the top of the adjacent bed in the upstream direction. As an example, by varying the size and/or number of openings in a support structure, the size of a fluidized bed can be varied at constant superficial gas velocity for the fluidizing gas. As another example, if superficial gas velocity varies due to conversion of methane to hydrogen, changing the size and/or number of openings in a support structure can allow a constant fluidized bed size to be maintained.

Another factor in the size of the fluidized beds can be the size of the reactor. As methane is converted to hydrogen plus solid carbon, one mole of methane produces two moles of hydrogen. This corresponds to an increase in gas volume as methane is converted to hydrogen. A still larger increase in gas volume can occur if larger hydrocarbons (such as the larger hydrocarbons present in natural gas) are used. One way to manage this increase in gas volume can be to allow the reactor size to increase in the pyrolysis reaction zone and/or in the downstream beds. This can allow, for example, a relatively constant superficial gas velocity to be maintained in the reactor, if desired.

In various aspects, the average residence time for the gas flow in a fluidized bed in the pyrolysis zone can vary depending on a variety of factors, including the number of fluidized beds in the pyrolysis zone, the desired net conversion of the feed to hydrogen, the temperature in the fluidized beds, the size of a given fluidized bed, and the pressure in the reactor. Examples of suitable residence times can range from 0.1 seconds to 500 seconds, or 0.1 seconds to 100 seconds, or 1 second to 100 seconds.

The flow rate of methane into the second stage of fluidized beds can be selected so that the fluidizing gas velocity is greater than the minimum fluidization velocity for the coke particles in any of the beds in the sequential plurality of fluidized beds. The minimum fluidization velocity for the coke particles can be readily estimated based on the density and particle size of each type of particle, and based on the density and viscosity of the fluidization gas. In some aspects, the flow rate of the partially converted effluent can be sufficient so that the partially converted effluent can serve as the fluidizing gas for the first stage of fluidized beds.

Coke Particle Transport

One of the difficulties with performing pyrolysis using a fluidized or moving bed is managing transport of particles within the system. Unlike fluids, it is typically not feasible to transport particles within a system simply by controlling pressures. One or more of gravity, mechanical assistance, and use of a transport fluid is typically needed to in order to cause particles to flow in a desired manner within a reaction system.

In various aspects, the systems and methods described herein provide for transport of coke particles within the pyrolysis reaction system while reducing or minimizing mechanical transport of the particles and also while reducing or minimizing introduction of diluent gases that would reduce the quality of the pyrolysis product. The improved particle transport achieved herein is enabled in part by the use of a plurality of sequential fluidized beds.

Within the reactor(s) containing the fluidized beds, the movement of coke particles can be controlled based on the support structure for the fluidized beds, the fluidized bed conditions, and gravity. The combination of the support structure and the fluidized bed conditions for each fluidized bed results in an average residence time for particles within each fluidized bed. This average residence time reflects the average time a particle stays within the bed until the particle passes through an opening in the support structure to fall (via gravitational pull) into the adjacent upstream bed.

To recycle or return coke particles from the bottom bed of the fluidized beds back to the top, any convenient method can be used. One example of a suitable method is to use the hydrogen-containing product as a transport gas, after exiting from the first upstream fluidized bed, a portion of the coke particles can be withdrawn and travel through a conduit (via gravity) into pneumatic transport conduit. The gas for the pneumatic transport conduit can be the hydrogen-containing product gas generated by the pyrolysis reaction system. After pneumatically lifting the coke particles, the coke particles can be separated from the hydrogen-containing product gas, such as by using a cyclone separator. The hydrogen-containing product gas can then be combined with the fresh product gas from the reactor for use as product and/or for use as the transport fluid.

Using gravity and pneumatic transport for movement of coke particles within the reaction system can provide various advantages relative to a reaction system that uses mechanical transport. For example, a screw feeder is a common device for movement of solids within a reaction system. Unfortunately, mechanical transport devices such as screw feeders are prone to causing particle agglomeration, binding, and/or abrasion of particles/surfaces within a reaction system. These physical side effects of mechanical particle transport can cause substantial variation in particle sizes, which can increase the likelihood of equipment damage and/or unreliable operation. However, in some aspects, mechanical transport of particles can be used to recycle coke particles.

In some optional aspects, a gas other than the hydrogen-containing product gas can be used as the pneumatic transport gas. For example, nitrogen could be used as the transport gas. Use of an inert transport gas increases the potential for a diluent gas to enter the reactor and therefore enter the hydrogen-containing product gas stream. However, such inert gases are effective for performing the pneumatic transport.

Configuration Examples

FIG. 1 shows an example of a general configuration for using electric heating in an $H_2$-rich environment to provide the heat for pyrolysis of methane (and/or other hydrocarbons) to form $H_2$. In FIG. 1, the system for performing methane pyrolysis is represented as a two-stage system. In a first stage 120, coke particles in a fluidized bed are heated by electric heating elements 127 to achieve a desired temperature for pyrolysis. The heated coke particles 125 are then passed into at least one fluidized bed in second stage 130. A methane-containing feed 101 (and/or other hydrocarbon-containing feed) is passed into second stage 130 in a counter-current direction. This pyrolysis results in a partially converted effluent 135 which is then passed into first stage 120. The partially converted effluent 135 can have an $H_2$ content of 60 vol % or more and/or a methane content of 40 vol % or less. Having a hydrogen content of 60 vol % or more can allow the gas phase environment in first stage 120 to correspond to a $H_2$-rich environment. This can reduce or minimize any coke deposition on the electric heating elements 127. The partially converted effluent 135 can then undergo further pyrolysis in first stage 120 to produce hydrogen-containing output 115. The coke exiting from the bottom of second stage 130 can be returned 160 back to the top of the first stage 120 by any convenient method.

Figure 2:
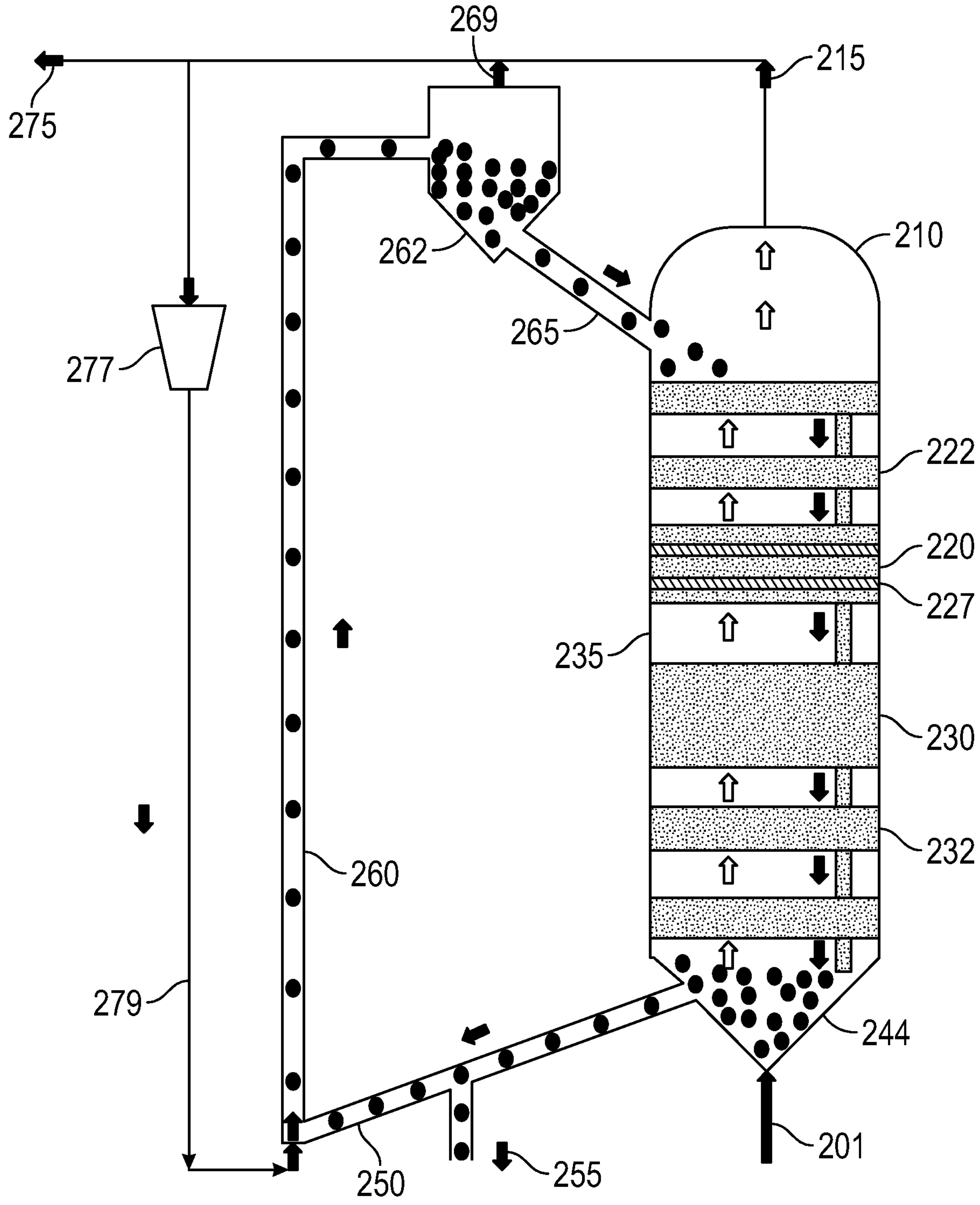
FIG. 2 shows an example of a reaction system for performing hydrocarbon pyrolysis using sequential fluidized beds.

FIG. 2 shows an example of a configuration for using sequential fluidized beds to perform methane pyrolysis while providing heat using electric heating elements. In FIG. 2, a reactor 210 is shown that contains a sequential plurality of fluidized beds. Reactor 210 is shown as a single reactor, but any convenient number of reactors could be used to house the fluidized beds. Reactor 210 includes a first group of fluidized beds that includes at least one fluidized bed 220 that contains electric heating elements 227. The first group of fluidized beds can also include one or more fluidized beds 222 that do not include heating elements, but can pre-heat coke particles based on heat transfer from hot gases passing in a counter-current direction through the beds. Reactor 210 also includes a second group of fluidized beds that includes at least one fluidized bed 230 that that is at a temperature of 1000° C. or more, in order to carry out the methane (and/or other hydrocarbon) pyrolysis. The second group of fluidized beds can also include one or more additional beds 232 that are at temperatures below 1000° C., but are still at a temperature of 700° C. or more, and therefore can allow some additional pyrolysis to occur. In some aspects, all of fluidized beds 220, 222, 230, and 232 can be at sufficiently high temperature that at least some pyrolysis occurs within each bed. Alternatively, one or more of fluidized beds 222 and/or 232 may be at a low enough temperature that substantially no hydrocarbon pyrolysis occurs.

In FIG. 2, electric heating elements 227 are used to heat the coke particles in fluidized bed 220 to a desired pyrolysis temperature. Although only a single fluidized bed 220 is shown in FIG. 2, in other aspects a plurality of fluidized beds 220 can include electric heating elements.

During operation, input gas flow 201, such as a methane or natural gas flow, can enter the reactor 210 from the bottom. The input gas flow 201 can serve as a fluidizing gas for the various fluidized beds as the gas flow moves up through the various fluidized beds. As the input gas flow 201 moves through fluidized beds 232 and 230 the input gas flow is heated by the successive fluidized beds to temperatures where pyrolysis can occur. This results in pyrolysis of at least a portion of the input gas flow to $H_2$, so that a partially converted effluent 235 is formed. The pyrolysis also produces solid carbon that is deposited on coke particles. The partially converted effluent 235 can include 60 vol % or more of $H_2$. The partially converted effluent 235 continues to pass through fluidized bed 220, where the partially converted effluent 235 provides an $H_2$-rich environment for heating of the coke particles in fluidized bed 220 by electric heating elements 227. Additional conversion of the partially converted effluent can also occur, so that a product gas flow 215 is formed. The product gas flow then continues through fluidized beds 222. It is noted that still further conversion of methane to hydrogen can take place in the product gas flow as the product gas flow passes through fluidized beds 222. The product gas flow 215 can be cooled by heat exchange in fluidized beds 222 prior to exiting from the top of reactor 210.

During operation, the coke particles in the reactor can flow in a counter-current manner relative to the input flow gas 201, partially converted effluent 235, and the hydrogen-containing product gas flow 215. In the example shown in FIG. 2, coke stream 265 is introduced into the top of fluidized bed(s) 222. The coke is pre-heated in fluidized bed(s) 222 by hydrogen-containing product gas flow 215. The coke particles are then heated further in fluidized bed 220 by electric heating elements 227, in order to achieve a desired temperature for pyrolysis. The heated coke is then passed into fluidized bed 230 for pyrolysis of the feed 201. The pyrolysis reaction adds carbon to the coke particles. The hot coke particles then continue into fluidized bed(s) 232, being cooled by heat exchange with input gas flow 201.

After exiting from fluidized bed(s) 232, the cooled coke particles pass into reservoir 244. A portion of the coke particles exit from reservoir 244 to form coke particle flow 250. A portion of coke particle flow 250 can be withdrawn from the system as coke product 255. The remainder of coke particle flow 250 is then recycled back to the top of the reactor. In FIG. 2, this is accomplished using pneumatic transport conduit 260, with a portion 279 of the hydrogen-containing product gas flow 215 being used as the pneumatic transport gas. A compressor or blower 277 can be used to provide sufficient pressure for the portion 279 to act as the pneumatic transport gas. At the top of the conduit 260, the coke particles are separated from the portion 269 of hydrogen-containing product gas flow in cyclone separator 262. This forms coke stream 265. In the example shown in FIG. 2, the portion 269 of the hydrogen-containing product gas flow is combined with the hydrogen-containing product gas flow 215. The hydrogen-containing product gas flow 215 is then used to form product hydrogen 275 and pneumatic transport gas flow 279.

Although not shown in FIG. 2, additional coke processing can also be performed on the coke particles at one or more locations. For example, coke processing can include chemical or thermal activation of the coke particles. Additionally or alternately, coke processing can include management of the particle size distribution, including removal of coke particles that have grown too large and/or removal of very fine particles. Still another option can be crushing of some large particles to achieve a particle-size-distribution in a desired range.

Additional Embodiments

Embodiment 1. A method for performing hydrocarbon pyrolysis to form $H_2$, comprising: heating a first fluidized bed of coke particles using one or more electric heating elements within the first fluidized bed to a temperature of 1000° C. or more in a first fluidized bed stage, a gas environment in the first fluidized bed comprising 60 vol % or more $H_2$; flowing at least a portion of the coke particles from the first fluidized bed into a second fluidized bed stage comprising coke particles, the second fluidized bed stage comprising a second fluidized bed having a temperature of 1000° C. or more; contacting a hydrocarbon-containing feed with coke particles in the second fluidized bed stage under pyrolysis conditions to form a partially converted effluent comprising $H_2$; and contacting at least a portion of the partially converted effluent with the first fluidized bed stage of coke particles to form an $H_2$-containing product.

Embodiment 2. The method of Embodiment 1, wherein the partially converted effluent comprises the fluidizing gas for the first fluidized bed of coke particles.

Embodiment 3. The method of any of the above embodiments, wherein the $H_2$-containing product comprises 80 vol % or more $H_2$, or wherein the partially converted effluent comprises 80 vol % or more $H_2$, or a combination thereof.

Embodiment 4. The method of any of the above embodiments, wherein the first fluidized bed stage comprises a plurality of sequential fluidized beds, the partially converted effluent being sequentially passed into each fluidized bed of the first fluidized bed stage; or wherein the second fluidized bed stage comprises a plurality of sequential fluidized beds, the hydrocarbon-containing feed being sequentially passed into each fluidized bed of the second fluidized bed stage; or a combination thereof.

Embodiment 5. The method of any of the above embodiments, wherein the first fluidized bed stage comprises one or more additional electric heating elements in one or more additional fluidized beds, a gas environment in the one or more additional fluidized beds comprising 60 vol % or more of $H_2$.

Embodiment 6. The method of any of the above embodiments, wherein the first fluidized bed stage comprises at least one fluidized bed that does not contain electric heating elements, the at least one fluidized bed being downstream from the first fluidized bed relative to a flow of the direction of the partially converted effluent.

Embodiment 7. The method of any of the above embodiments, i) wherein the first fluidized bed is heated to a temperature of 1200° C. or more; ii) wherein the second fluidized bed comprises a temperature of 1100° C. or more; iii) wherein the hydrocarbon-containing feed is passed through a plurality of sequential fluidized beds having a temperature of 1000° C. or more in the second fluidized bed stage; or iv) a combination of two or more of i), ii), and iii).

Embodiment 8. The method of any of the above embodiments, further comprising flowing a second portion of coke particles out of the second fluidized bed stage, and passing at least a recycle fraction of the second portion of coke particles into the first fluidized bed stage, the recycle fraction of the second portion of coke particles comprises a temperature of 700° C. or more.

Embodiment 9. The method of Embodiment 8, wherein flowing the second portion of coke particles out of the second fluidized bed stage comprises flowing the second portion of coke particles out of the second fluidized bed, or wherein passing at least a recycle fraction of the second portion of coke particles into the first fluidized bed stage comprises passing at least a recycle fraction of the second portion of coke particles into the first fluidized bed, or a combination thereof.

Embodiment 10. The method of Embodiment 8 or 9, wherein passing the at least a recycle fraction of the second portion of coke particles into the first fluidized bed stage comprises: pneumatically transporting the at least a recycle fraction of the second portion of coke particles using a pneumatic transport gas; separating the at least a recycle fraction of the second portion of coke particles from the pneumatic transport gas; separating at least a portion of the pneumatic transport gas from the hydrogen-containing effluent prior to the pneumatically transporting; and combining at least a portion the pneumatic transport gas with the hydrogen-containing effluent after the pneumatically transporting.

Embodiment 11. The method of any of the above embodiments, wherein the first fluidized bed in the first fluidized bed stage is adjacent to the second fluidized bed in the second fluidized bed stage.

Embodiment 12. The method of any of the above embodiments, a) wherein the hydrocarbon-containing feed comprises 95 vol % or more of hydrocarbons; b) wherein the hydrocarbon-containing feed comprises methane, natural gas, or a combination thereof; or c) a combination of a) and b).

Embodiment 13. A system for performing hydrocarbon pyrolysis, comprising: a first fluidized bed stage comprising a first fluidized bed of coke particles and one or more electric heating elements within the first fluidized bed; a second fluidized bed stage comprising a second fluidized bed of coke particles, the second fluidized bed stage being in fluid communication and particle transport communication with the first fluidized bed stage; a particle recycle loop providing fluid communication between a first upstream fluidized bed in the second fluidized bed stage and a final downstream fluidized bed in the first fluidized bed stage, the particle recycle loop comprising a pneumatic transport conduit; a feed inlet in fluid communication with the second fluidized bed stage; and a product effluent outlet in fluid communication with the first fluidized bed stage.

Embodiment 14. The system of Embodiment 13, wherein the first fluidized bed stage comprises a plurality of fluidized beds, or wherein the second fluidized bed stage comprises a plurality of fluidized beds, or wherein the first fluidized bed is adjacent to the second fluidized bed, or a combination thereof.

Embodiment 15. The system of Embodiment 13 or 14, the system further comprising a pneumatic transport gas recycle loop providing fluid communication between the product effluent outlet and the particle recycle loop, wherein the particle recycle loop and the pneumatic transport gas recycle loop comprise a gas-solid separation stage While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for performing hydrocarbon pyrolysis to form $H_2$, comprising:

heating a first fluidized bed of coke particles using one or more electric heating elements within the first fluidized bed to a temperature of 1000° C. or more in a first fluidized bed stage, a gas environment in the first fluidized bed comprising 60 vol % or more $H_2$;

flowing at least a portion of the coke particles from the first fluidized bed into a second fluidized bed stage comprising coke particles, the second fluidized bed stage comprising a second fluidized bed having a temperature of 1000° C. or more;

contacting a hydrocarbon-containing feed with coke particles in the second fluidized bed stage under pyrolysis conditions to form a partially converted effluent comprising $H_2$; and contacting at least a portion of the partially converted effluent with the first fluidized bed stage of coke particles to form an $H_2$-containing product.

2. The method of claim 1, wherein the partially converted effluent comprises the fluidizing gas for the first fluidized bed of coke particles.

3. The method of claim 1, wherein the $H_2$-containing product comprises 80 vol % or more $H_2$, or wherein the partially converted effluent comprises 80 vol % or more $H_2$, or a combination thereof.

4. The method of claim 1, wherein the first fluidized bed stage comprises a plurality of sequential fluidized beds, the partially converted effluent being sequentially passed into each fluidized bed of the first fluidized bed stage; or wherein the second fluidized bed stage comprises a plurality of sequential fluidized beds, the hydrocarbon-containing feed being sequentially passed into each fluidized bed of the second fluidized bed stage; or a combination thereof.

5. The method of claim 1, wherein the first fluidized bed stage comprises one or more additional electric heating elements in one or more additional fluidized beds, a gas environment in the one or more additional fluidized beds comprising 60 vol % or more of $H_2$.

6. The method of claim 1, wherein the first fluidized bed stage comprises at least one fluidized bed that does not contain electric heating elements, the at least one fluidized bed being downstream from the first fluidized bed relative to a flow of the direction of the partially converted effluent.

7. The method of claim 1, a) wherein the hydrocarbon-containing feed comprises 95 vol % or more of hydrocarbons; b) wherein the hydrocarbon-containing feed comprises methane, natural gas, or a combination thereof; or c) a combination of a) and b).

8. The method of claim 1, wherein the first fluidized bed is heated to a temperature of 1200° C. or more, or wherein the second fluidized bed comprises a temperature of 1100° C. or more, or a combination thereof.

9. The method of claim 1, wherein the hydrocarbon-containing feed is passed through a plurality of sequential fluidized beds having a temperature of 1000° C. or more in the second fluidized bed stage.

10. The method of claim 1, further comprising flowing a second portion of coke particles out of the second fluidized bed stage, and passing at least a recycle fraction of the second portion of coke particles into the first fluidized bed stage.

11. The method of claim 10, wherein flowing the second portion of coke particles out of the second fluidized bed stage comprises flowing the second portion of coke particles out of the second fluidized bed, or wherein passing at least a recycle fraction of the second portion of coke particles into the first fluidized bed stage comprises passing at least a recycle fraction of the second portion of coke particles into the first fluidized bed, or a combination thereof.

12. The method of claim 10, wherein the recycle fraction of the second portion of coke particles comprises a temperature of 700° C. or more.

13. The method of claim 10, wherein passing the at least a recycle fraction of the second portion of coke particles into the first fluidized bed stage comprises:

pneumatically transporting the at least a recycle fraction of the second portion of coke particles using a pneumatic transport gas; and separating the at least a recycle fraction of the second portion of coke particles from the pneumatic transport gas.

14. The method of claim 13, further comprising separating at least a portion of the pneumatic transport gas from the hydrogen-containing effluent prior to the pneumatically transporting.

15. The method of claim 14, further comprising combining at least a portion the pneumatic transport gas with the hydrogen-containing effluent after the pneumatically transporting.

16. The method of claim 1, wherein the first fluidized bed in the first fluidized bed stage is adjacent to the second fluidized bed in the second fluidized bed stage.

* * * * *